United States Patent
Limbeck et al.

(10) Patent No.: US 8,053,122 B2
(45) Date of Patent: Nov. 8, 2011

(54) SYSTEM AND METHOD OF STARTING A FUEL CELL SYSTEM

(75) Inventors: Uwe M. Limbeck, Kirchheim/Teck (DE); Marcus Aberle, Kirchheim/Teck (DE); Craig R. Louie, West Vancouver (CA); Amy E. Nelson, Vancouver (CA)

(73) Assignee: BDF IP Holdings Ltd., Vancouver (CA)

( * ) Notice: Subject to any disclaimer, the term of this patent is extended or adjusted under 35 U.S.C. 154(b) by 842 days.

(21) Appl. No.: 12/101,771

(22) Filed: Apr. 11, 2008

(65) Prior Publication Data
US 2009/0258256 A1    Oct. 15, 2009

(51) Int. Cl.
*H01M 8/04* (2006.01)
*H01M 8/22* (2006.01)

(52) U.S. Cl. ........ 429/429; 429/432; 429/440; 429/443; 429/505

(58) Field of Classification Search .............. 429/415, 429/429, 432, 442, 414, 416, 431, 444, 513, 429/505, 440, 443
See application file for complete search history.

(56) References Cited

U.S. PATENT DOCUMENTS

| | | | |
|---|---|---|---|
| 6,013,385 A * | 1/2000 | DuBose | 429/410 |
| 6,329,089 B1 | 12/2001 | Roberts et al. | |
| 6,387,556 B1 * | 5/2002 | Fuglevand et al. | 429/429 |
| 6,887,598 B2 | 5/2005 | Thompson et al. | |
| 2003/0129462 A1 * | 7/2003 | Yang et al. | 429/17 |
| 2003/0138680 A1 | 7/2003 | Goebel et al. | |
| 2004/0076860 A1 | 4/2004 | Aso | |
| 2005/0074649 A1 | 4/2005 | Skiba et al. | |
| 2005/0142407 A1 | 6/2005 | Fuller et al. | |
| 2005/0170228 A1 | 8/2005 | Tajiri et al. | |
| 2006/0115694 A1 * | 6/2006 | Igarashi et al. | 429/13 |
| 2006/0246331 A1 * | 11/2006 | Steinbroner | 429/23 |

FOREIGN PATENT DOCUMENTS

| | | |
|---|---|---|
| DE | 10110352 A1 | 9/2002 |
| JP | 2004207149 A * | 7/2004 |
| JP | 2004296351 A | 10/2004 |
| WO | 00/74162 A1 | 12/2000 |
| WO | 2005053075 A1 | 6/2005 |

OTHER PUBLICATIONS

Machine Translation of: JP 2004/207149 A, Kako et al., Jul. 22, 2004.*

* cited by examiner

*Primary Examiner* — Jonathan Crepeau
*Assistant Examiner* — Kenneth Douyette
(74) *Attorney, Agent, or Firm* — Seed IP Law Group PLLC

(57) ABSTRACT

A system and method for starting up a fuel cell system are disclosed. Briefly described, an embodiment for starting an electrochemical reaction between a fuel and an oxidant during a start-up process includes a fuel cell stack operable to output a nominal voltage during a normal operating condition and operable to output a reduced start-up voltage during the start-up process, and includes at least one balance of plant (BOP) device that supports operation of the fuel cell stack, operable at a nominal output when sourced by the fuel cell stack at the nominal voltage, and operable at a reduced output when sourced by the fuel cell stack at the reduced start-up voltage.

8 Claims, 4 Drawing Sheets

SYSTEM AND METHOD OF STARTING A FUEL CELL SYSTEM

BACKGROUND

1. Field

This disclosure generally relates to electrical power systems, and more particularly to fuel cell stack start-up systems.

2. Description of the Related Art

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst, disposed at the interfaces between the electrolyte and the electrodes, typically induces the desired electrochemical reactions at the electrodes. The location of the electrocatalyst generally defines the electrochemically active area.

One type of electrochemical fuel cell is the proton exchange membrane (PEM) fuel cell. PEM fuel cells generally employ a membrane electrode assembly (MEA) comprising a solid polymer electrolyte or ion-exchange membrane disposed between two electrodes. Each electrode typically comprises a porous, electrically conductive substrate, such as carbon fiber paper or carbon cloth, which provides structural support to the membrane and serves as a fluid diffusion layer. The membrane is ion conductive, typically proton conductive, and acts both as a barrier for isolating the reactant streams from each other and as an electrical insulator between the two electrodes. A typical commercial PEM is a sulfonated perfluorocarbon membrane sold by E.I. du Pont de Nemours and Company under the trade designation NAFION®. The electrocatalyst is typically a precious metal composition (e.g., platinum metal black or an alloy thereof) and may be provided on a suitable support (e.g., fine platinum particles supported on a carbon black support).

In a fuel cell, an MEA is typically interposed between two separator plates that are substantially impermeable to the fuel stream. The plates typically act as current collectors and provide support for the MEA. In addition, the plates may have fuel channels formed therein and act as flow field plates providing access for the fuel streams to the respective porous electrodes and providing for the removal of reaction products formed during operation of the fuel cell.

In a fuel cell stack, a plurality of fuel cells are connected together, typically in series, to increase the overall output power of the assembly. In such an arrangement, one side of a given separator plate may serve as an anode flow field plate for one cell and the other side of the plate may serve as the cathode flow field plate for the adjacent cell. In this arrangement, the plates may be referred to as bipolar plates. Typically, a plurality of inlet ports, supply manifolds, exhaust manifolds and outlet ports are utilized to direct the fuel to the fuel channels in the flow field plates. The supply and exhaust manifolds may be internal manifolds, which extend through aligned openings formed in the flow field plates and MEAs, or may comprise external or edge manifolds, attached to the edges of the flow field plates.

A broad range of reactants, interchangeably referred to as fuel, can be used in PEM fuel cells. For example, the fuel may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a PEM fuel cell, hydrogen in the fuel is electrochemically reduced on the anode side, typically resulting in the generation of protons, electrons, and possibly other species depending on the fuel employed. The protons are conducted from the reaction sites at which they are generated, through the membrane, to electrochemically react with oxygen in the oxidant on the cathode side. The electrons travel through an external circuit providing useable power and then react with the protons and oxygen on the cathode side to produce water.

One significant factor affecting the start-up process is the initial temperature of the fuel cells when the start-up process is initiated. When the fuel cells are relatively cold, the electrochemical reaction process is very inefficient. It is known to take measures to provide heat to the fuel cells during start-up to expedite the start-up process. For example, an auxiliary heater device may be used to provide heat to the fuel cells. It is also known to operate the fuel cells at a reduced voltage to internally generate heat within the fuel cells through relatively high power losses.

Conventional fuel cell stacks, and their associated individual fuel cells, operate at a relatively high minimum stack, cell, and/or the respective fuel cell voltage, during normal operating conditions. For example, in some automotive applications, a fuel cell stack provides a nominal output voltage of 250 volts (V) at 300 amps. Individual, serially connected fuel cells of the fuel cell stack output a nominal voltage of approximately 0.5 volts per fuel cell during normal operating conditions.

However, during a cold start-up process, especially sub-zero start-up, polarization curves are significantly less than the polarization curves provided from the fuel cells during normal operation. For example, a fuel cell stack may provide an output current of 100 amps at an operational stack voltage of 250 volts at cold temperatures and 200 amps at 250 volts at normal operational temperatures.

As the start-up process of the fuel cell stack proceeds, stack and individual fuel cell polarization curves rise from the above-described start-up polarization curves to the normal operating polarization curves. Accordingly, a period of time is required for the start-up process before sufficient voltage and current are available from the fuel cell stack for normal operating conditions.

However, various balance of plant (BOP) devices supporting operation of a fuel cell system are not always designed for operation at the reduced voltages provided by a fuel cell stack during start-up. An example of a BOP device is an oxidant supply device, for instance a blower, fan or air compressor that provides a nominal rate of airflow to the fuel cells when sourced, or powered, at the nominal voltage range during normal operating conditions. Another example is a coolant pump that circulates a coolant through the fuel cell stack at a nominal rate when sourced at the nominal voltage range. A further example is an anode recirculation pump that recirculates a fuel stream to the fuel cells at a nominal rate when sourced at the nominal voltage range. The above-described BOP devices are essential for fuel cell operation. Accordingly, during the start-up process before sufficient voltage and current are available from the fuel cell stack, these BOP devices are sourced from an auxiliary power supply, such as a battery, an ultracapacitor, and/or a relatively small combustion engine. However, such auxiliary power supplies may be limited in their output current and/or energy capacity especially when cold, thereby limiting the number of BOP devices and/or limiting the time that the BOP devices may be sourced.

Furthermore, during the start-up process before sufficient voltage and current are available from the fuel cell stack, other system loads may also require power from the auxiliary power supply. Otherwise, the other system loads must remain off until the fuel cell stack is able to provide sufficient voltage and current to source these system loads. For example, in some automotive applications, an electric passenger compartment heater is used to heat the passenger compartment. During start-up conditions, the passenger compartment heater cannot be operated unless otherwise sourced from the auxiliary power supply. Because of the high current drawn by the passenger compartment heater, it may not be practical to source the passenger compartment heater from a limited capacity auxiliary power supply. Accordingly, decreasing the period for start-up process of a cold fuel cell stack would be desirable.

Although there have been advances in the field, there remains a need in the art for increasing efficiency of the fuel cell stack start-up process. The present disclosure addresses these needs and provides further related advantages.

BRIEF SUMMARY

A system and method for starting up a fuel cell system are disclosed. Briefly described, in one aspect, an embodiment may be summarized as a system for starting an electrochemical reaction between a fuel and an oxidant during a start-up process, comprising a fuel cell stack operable to output a nominal voltage during a normal operating condition and operable to output a reduced start-up voltage during the start-up process, and at least one balance of plant (BOP) device that supports operation of the fuel cell stack. The BOP device is operable at a nominal output when sourced by the fuel cell stack at the nominal voltage, and is operable at a reduced output when sourced by the fuel cell stack at the reduced start-up voltage.

In another aspect, an embodiment may be summarized as a method for starting a fuel cell system comprising injecting a fuel into the fuel cell stack during a start-up process; receiving power at a reduced start-up voltage from the fuel cell stack during the start-up process, wherein the reduced start-up voltage is less than a nominal voltage of the fuel cell stack; sourcing at least one BOP device with the power at the reduced start-up voltage; and operating the at least one BOP device at a reduced output in response to sourcing at the reduced start-up voltage.

In another aspect, an embodiment may be summarized as a method for starting a fuel cell stack comprising initially injecting a fuel into the fuel cell stack to start an electrochemical reaction characterized by a first polarization curve, and sourcing a first BOP device at a reduced voltage on the first polarization curve to generate heat within the fuel cell stack.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments. However, one skilled in the art will understand that the invention may be practiced without these details. In other instances, well-known structures associated with fuel cells, fuel cell systems, controllers, control systems, balance of plant, power converters, controllers and/or gate drives have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings provided herein are for convenience only and do not interpret the scope or meaning of the claimed invention.

Power System Overview

Figure 1:
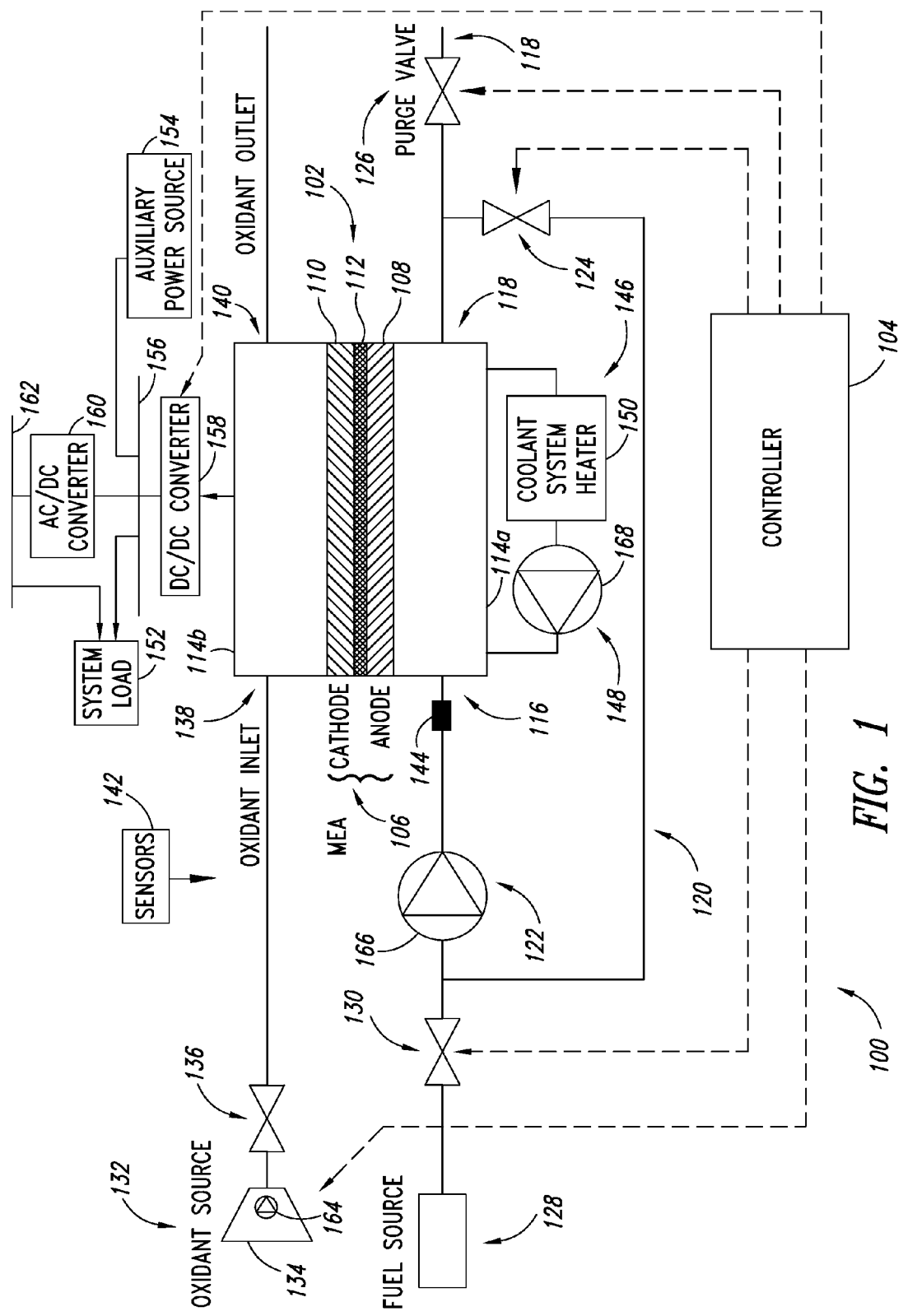
FIG. 1 is a schematic diagram of an exemplary embodiment of a power system.

FIG. 1 is a schematic diagram of an exemplary embodiment of a power system 100. Power system 100 comprises a fuel cell stack 102 and a controller 104. Fuel cell stack 102 includes at least one membrane electrode assembly (MEA) 106 including two electrodes, the anode 108 and the cathode 110, separated by an ion exchange membrane 112.

A membrane electrode assembly 106 resides between a pair of flow field plates 114a, 114b. In the illustrated embodiment, the flow field plate 114a includes one or more fuel channels (not shown) formed on or in a planar surface of flow field plate 114a for carrying fuel to anode 108. The flow field plate 114b includes one or more oxidant channels (not shown) formed on or in a planar surface of flow field plate 114b for carrying oxidant (e.g., air) to cathode 110. In some embodiments, oxidant channels that carry the oxidant also carry exhaust air and product water away from cathode 110.

Power system 100 includes a fuel inlet 116 for introducing a supply of fuel into anode 108 and a fuel outlet 118 for discharging an exhaust fuel stream from anode 108. The exhaust fuel stream comprises primarily water, nonreactive components, impurities, and some amounts of residual fuel.

The supply and exhaust fuel streams may be collectively referred to as a reactant stream or fuel stream for convenience. For convenience, the fuel inlet 116 and/or the fuel outlet 118 may also be referred to as a reactant inlet and a reactant outlet, respectively.

In some embodiments, the power system 100 may have a fuel recirculation system 120 designed to recirculate the exhaust fuel stream from the fuel outlet 118 back to the fuel inlet 116. A fuel recirculation pump 122 recirculates the exhaust fuel stream to fuel cell stack 102 at a desired flow rate. Optionally, a recirculation valve 124 may be included to control flow through the fuel recirculation system 120. Spent or unreacted fuel may be discharged through the fuel outlet 118 by temporarily opening a purge valve 126.

In one embodiment, each membrane electrode assembly 106 is designed to produce a nominal potential difference of about 0.6 volts (v) between the anode 108 and the cathode 110. Accordingly, a plurality of individual membrane electrode assemblies 106 and their associated flow field plates 114a, 114b may be electrically operated in series in a fuel cell stack 102 to produce current at a desired voltage. For convenience, an individual membrane electrode assembly 106 and its associated flow field plates 114a, 114b may be referred to as a fuel cell.

Fuel source system 128 provides fuel (e.g., hydrogen) to the anode 108 by way of fuel source system 128. For example, the fuel source system 128 may include a source of fuel such as one or more fuel tanks (not shown) and a fuel regulating system (not shown) for controlling delivery of the fuel into the fuel stream. Fuel source system 128 may be coupled to a main gas valve 130. Valve 130 is controlled by controller 104 for controlling the flow of fuel introduction to the fuel stream. In one embodiment, the controller 104 is operable to throttle the main gas valve 130 to reduce a rate at which fuel is added to the fuel stream.

The purge valve 126 is provided at the fuel stream outlet port 118 of fuel cell stack 102 and is typically operated in a closed position when fuel cell stack 102 is operating. Exhausted fuel is purged from fuel cell stack 102 only as needed to sustain the desired rate of electrochemical reaction. Further, nitrogen (and other impurities) may begin to contaminate the fuel stream. When the presence of these impurities and depletion of fuel leads to a degraded performance of the fuel cell stack 102, controller 104 sends a signal to the purge valve 126 to open so as to allow discharge of the exhausted fuel, impurities and other nonreactive components that may have collected in the fuel stream. A purge is appropriately limited to a short period of time to limit the loss of useful fuel, as such losses lower the efficiency of the fuel cell stack 102.

Power system 100 provides oxidant, such as oxygen rich air, to the cathode 110 of membrane electrode assemblies 106 by way of an oxidant source system 132. A source of oxygen or air to the oxidant source system 132 can take the form of an oxygen tank or the ambient atmosphere. In some embodiments, an active oxidant supply device 134 such as a blower, fan or air compressor provides a flow of air to fuel cell stack 102, via the oxidant inlet 138, at a desired flow rate. Optionally, an air supply valve 136 may also be included. The airflow passes through the cathode 110, exiting out the oxidant outlet 140.

Controller 104 is coupled to a plurality of sensors 142 for monitoring power system 100 surroundings. During operation, controller 104 receives the various sensor measurements such as, but not limited to, ambient air temperature, fuel pressure, fuel concentration, fuel cell stack current, air mass flow, and voltage across the fuel cell stack 102. Controller 104 provides the control signals to the various devices, such as the above-described valves and/or the balance of plant (BOP) devices described in greater detail below, to control operation of the power system 100.

Some embodiments further comprise an optional jet pump system 144. Jet pump system 144 forcibly ejects fuel into the anode 108 at a relatively higher pressure and/or velocity. One type of jet pump system 144 employs two nozzles each ejecting the fuel at different pressures and/or velocities.

The power system 100 further comprises a thermal management system 146 operable to provide a thermal transport fluid (e.g., coolant) to the fuel cell stack 102. During normal operation, the thermal transport fluid is circulated through the fuel cell stack 102 by a thermal management pump 148 so that the thermal transport fluid removes excess heat generated by the electrochemical reaction. Some embodiments may further comprise an optional thermal management system heater 150. Thermal management system heater 150 is operable to heat the thermal transport fluid during a start-up process. Circulating the heated thermal transport fluid facilitates the start-up process by raising the temperature of the membrane electrode assemblies 106.

Electrical power is output from the fuel cell stack 102 to one or more system loads 152 and/or an auxiliary power source 154, via a direct current (DC) bus 156. Fuel cell stack 102 is coupled to the DC bus 156 via a direct current to direct current (DC/DC) converter 158 that is operable to convert power output from the fuel cell stack 102 at the fuel cell stack voltage to a voltage of the DC bus 156. The DC/DC converter 158 may be designed to operate with a lower input voltage threshold. Auxiliary power source 154 may include one or more batteries and/or ultracapacitors (not shown). When system loads 152 are sourced from the DC bus 152, such loads are understood to be DC devices.

Typically, power system 100 will include or source alternating current (AC) loads. Accordingly, such embodiments employ an alternating current to direct current (AC/DC) converter 160 which couples the DC bus 156 to an AC bus 162. AC loads may then be sourced from the AC bus 162. When system loads 152 are sourced from the AC bus 162, such loads are understood to be AC devices.

The above-described embodiment of power system 100, including the fuel cell stack 102 and the controller 104, generally describe an exemplary embodiment. Other embodiments of a power system 100 may include other components and/or systems not described in detail herein for brevity. Such alternative power systems 100 are too numerous to conveniently be described herein, and are omitted for brevity. However, any alternative power systems 100 are intended to be included within the scope of this disclosure.

Fuel Cell BOP Devices

Generally, balance of plant (BOP) devices are loads which contribute to the normal operation of the fuel cell system (e.g., control system, fuel or air supply systems, coolant system). Embodiments of the power system 100 control the operation of selected BOP devices which are operable at both nominal voltages and reduced start-up voltages. Operating selected BOP devices at the reduced start-up voltages allows more current to be drawn from the fuel cell stack 102 during the start-up process. Operating the fuel cell stack 102 at a reduced start-up voltage results in more generation of heat within the fuel cell stack 102, significantly speeding the fuel cell starting up and reaching normal operating temperature and performance. Increasing temperatures increase the rate of the electrochemical reaction within the fuel cell stack 102. A plurality of selected BOP devices may be sequentially operated to maintain the reduced start-up voltage. This start-up process is described in greater detail hereinbelow.

Some types of BOP devices employ motors which are operable at both nominal voltages and reduced start-up voltages. An example of a motor that is operable at reduced start-up voltages is a variable speed motor. Variable speed motors operate at a reduced speed, and consequently at a reduced torque output, when sourced at a reduced start-up voltage. Such motors may include DC motors that are sourced with DC power or may include AC motors that are sourced with AC power. Exemplary BOP devices that use a motor operable at a reduced speed and/or torque when sourced at a reduced start-up voltage are described in greater detail hereinbelow.

As noted above, operation of the oxidant supply device (e.g., blower, fan or air compressor) 134 supplies oxygen rich air to the cathode 110. The oxidant supply device 134 is driven by motor 164 such that a flow of air is transported to the oxidant inlet 138, through the cathode 110, and out the oxidant outlet 140.

During normal operation, when motor 164 is sourced at its nominal rated voltage, oxidant supply device 134 supplies a sufficient amount of air to fully support the electrochemical reaction process occurring within the fuel cell stack 102 because motor 164 is operating at its nominal speed and/or its nominal torque output. However, during the start-up process, the amount of air required by the fuel cell stack 102 is significantly less than the amount of air required during normal operating conditions. That is, less air (corresponding to a relatively lower amount of air flow) is required because the amount of oxygen consumed by the electrochemical reaction process during the start-up process is relatively small.

Embodiments source motor 164 with a reduced start-up voltage during the start-up process of the fuel cell stack 102. Sourcing motor 164 at a reduced start-up voltage results in a reduced amount of airflow through the cathode 110 because motor 164 is operating at a reduced speed and/or a reduced torque output. However, this reduced amount of airflow is sufficient for starting the electrochemical reaction process within the fuel cell system 102.

As noted above, operation of the fuel recirculation system 120 and pump 122 recirculates fuel stream through the anode 108. The pump 122 is driven by motor 166 such that the fuel stream is transported to the fuel inlet 116, through the anode 108, and out the fuel outlet 118.

During normal operation, when motor 166 is sourced at its nominal rated voltage, pump 122 supplies a sufficient amount of fuel to fully support the electrochemical reaction process occurring within the fuel cell stack 102 because motor 166 is operating at its nominal speed and/or its nominal torque output. However, during the start-up process, the amount of fuel required by the fuel cell stack 102 is significantly less than the amount of fuel required during normal operating conditions. That is, less fuel (corresponding to a relatively slower fuel stream) is required because the amount of fuel consumed by the electrochemical reaction process during the start-up process is relatively small.

Embodiments source motor 166 with a reduced start-up voltage during the start-up process of the fuel cell stack 102. Sourcing motor 166 at a reduced start-up voltage results in a relatively slower fuel stream through the anode 108 because motor 166 is operating at a reduced speed and/or a reduced torque output. However, this relatively slower fuel stream is sufficient for starting the electrochemical reaction process within the fuel cell system 102.

During normal operation, considerable excess heat is generated within the fuel cells 106. As noted above, a thermal transport fluid is circulated through the fuel cell stack 102 by the thermal management system 146 to remove the excess heat. Motor 168 operates the thermal management system pump 148. Sourcing motor 168 at its nominal voltage results in the designed amount of thermal transport fluid flow through the fuel cell stack 102 because motor 168 is operating at its nominal speed and/or its nominal torque output.

However, during the start-up process in selected embodiments, not as much thermal transport fluid flow is required by the fuel cell stack 102 because the temperature of the fuel cell stack 102 is typically relatively low. Embodiments equipped with the thermal management system heater 150 may source the thermal management system heater 150 to heat the thermal transport fluid in the thermal management system 146. The thermal management system heater 150 may be sourced at the reduced start-up voltage provided by the fuel cell stack 102. Alternatively, the thermal management system heater 150 may be sourced from auxiliary power source 154. The heated thermal transport fluid may then be circulated through the fuel cell stack 102 to increase the temperature.

Such embodiments source motor 168 with a reduced start-up voltage during the start-up process of the fuel cell stack 102. Sourcing motor 168 at a reduced start-up voltage results in a reduced amount of heated thermal transport fluid flow through the fuel cell stack 102 because motor 168 is operating at a reduced speed and/or a reduced torque output. However, this reduced amount of thermal transport fluid flow raises the temperature within the fuel cell system 102 during the start-up process.

The above-described motors 164, 166 and/or 168 may be DC motors sourced from DC bus 156. In other embodiments, the motors 164, 166 and/or 168 may be AC motors sourced from AC bus 162.

Fuel Cell System Start-Up Process Overview

Initially, the fuel cell stack 102 is not actively producing power since there is no fuel in the anode 108 and air in the cathode 110 to support the electrochemical reaction process. Accordingly, the start-up process begins when fuel is supplied from fuel source 128 and air from the oxidant source.

Figure 2:
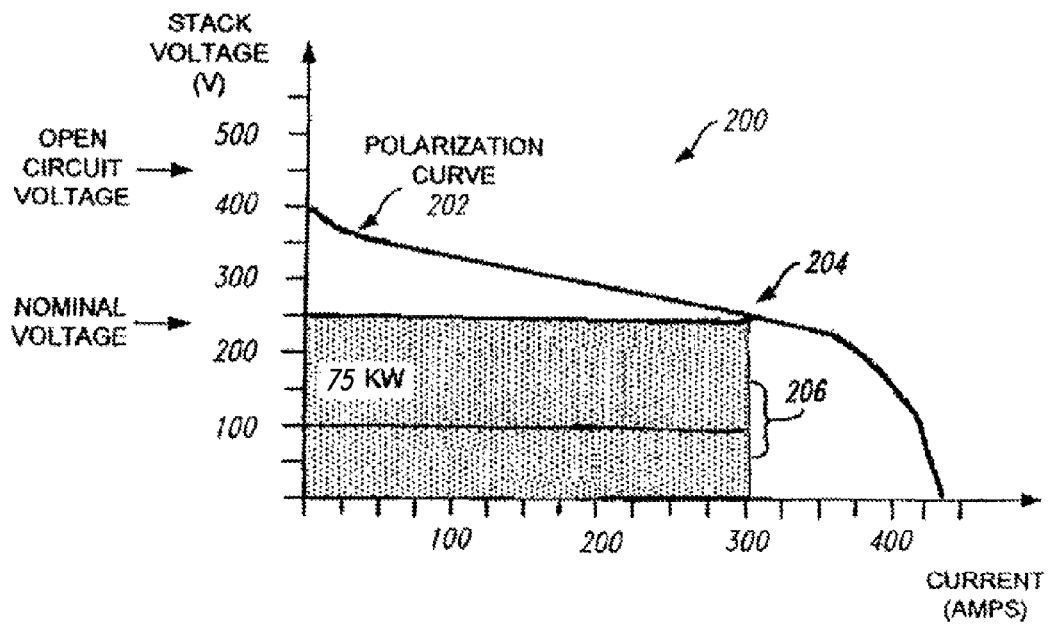
FIG. 2 is a graph of a polarization curve that illustrates operating points of a fuel cell stack during normal operation of the power system.

A relatively small amount of fuel is initially injected into the anode 108 to start the electrochemical reaction process. The fuel is injected by the opening valve 130 and operating pump 122. Pump 122 is initially sourced by the auxiliary power source 154. Fuel recirculation and thermal transport fluid recirculation start as well at reduced start up voltage, and all on auxiliary power source. FIG. 2 is a graph 200 of a polarization curve 202 that illustrates operating points of the fuel cell stack 102 (FIG. 1) during normal operation of the power system 100. The polarization curve 202 illustrates hypothetical operating points for various voltages (the vertical axis) of the fuel cell stack 102 and corresponding output currents (the horizontal axis) from the fuel cell stack 102. In particular, the polarization curve 202 illustrates an operating point 204 wherein 300 amps are provided at a nominal voltage of 250 volts, which corresponds to 75 kilowatts (kW) of power. For example, the 75 kW of power may supplied from the fuel cell stack 102 to the BOP devices and other system loads 152 at the nominal voltage during normal operation of the power system 100. However, the fuel cell stack 102 requires a period of time before it reaches the polarization curve 202. That is, if the fuel cell is cold, especially sub-zero during the initial stages of the start-up process, it is appreciated that there is no practical way that the fuel cell stack 102 can initially provide the illustrated 75 kW of power.

Also illustrated in FIG. 2 is an exemplary reduced start-up voltage. During the start-up process the power system 100 is limited to providing current at the start-up voltage and/or within start-up voltage range 206 to at least one selected BOP device. For convenience, the start-up voltage is illustrated in FIG. 2 as 100 V. In one exemplary embodiment, the start-up voltage range 206 of the fuel cell stack 102 is from 100 V to 150 V (corresponding to a cell count of 500 and a cell voltage of 0.2 V to 0.3 V).

Figure 3:
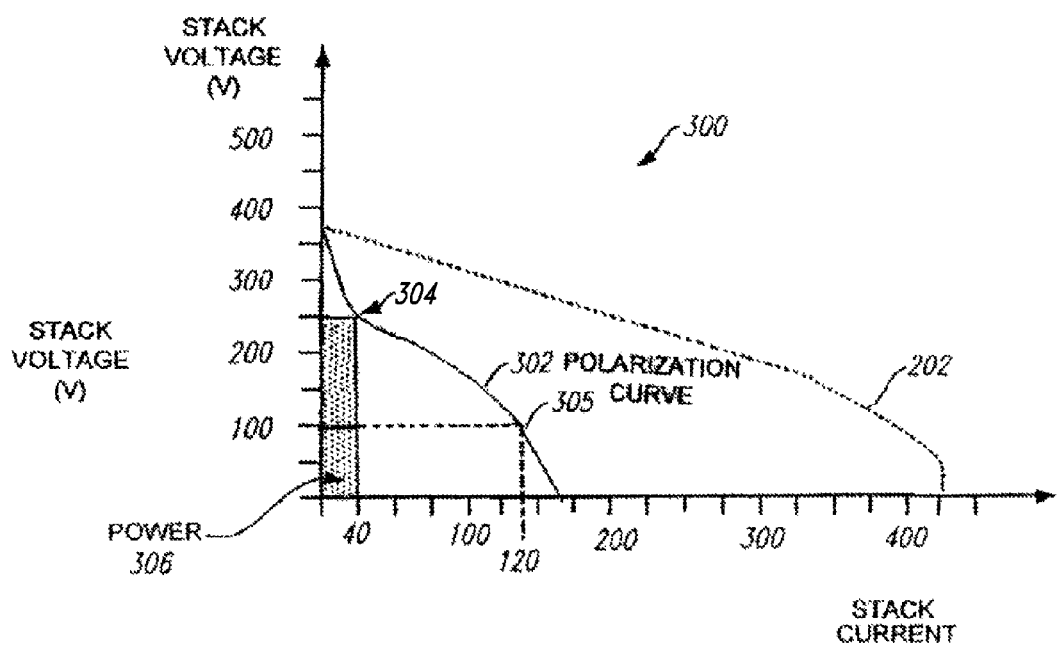
FIG. 3 is a graph of a polarization curve that illustrates operating points during the initial stages of a start-up process of the fuel cell stack wherein a selected BOP device is sourced at the reduced start-up polarization curve.

FIG. 3 is a graph 300 of a polarization curve 302 that illustrates operating points during the initial stages of a start-up process with a cold stack. The exemplary polarization curve 302 illustrates a hypothetical operating point 304 wherein 40 amps at the normal start-up voltage of 250 V is available from the fuel cell stack 102 for a total power of 10 kW. The available power is indicated by reference numeral 306. Operating point 305 on cold polarization curve 302 demonstrates higher available current of 120 amps at the reduced startup voltage of 100 V for a total power of 12 kW. The amount of power in the two cases, reference numbers 304 and 305, respectively, are somewhat different but can also be the same depending on the polarization curve shape and the actual operating voltage. This power of 10 or 12 kW can operate the BOP loads, or can charge the auxiliary load if there are insufficient available BOP loads or system loads. If the fuel cell power is not enough for the BOP loads, the additional power can come the auxiliary loads. The amount of power being drawn from the fuel cell can be adjusted to keep the voltage in the preferred range by controlling the power to and from the system and the BOP loads and the auxiliary loads. It is appreciated that by maintaining operation of the fuel cell stack 102 at the illustrated reduced start-up voltage of 100 V as opposed to the normal operational voltage of 270 V, that excess heat is being generated within the fuel cell stack 102. At operating point indicated by reference numeral 304, approximately 14 kW of excess heat is being generated whereas at point indicated by reference numeral 305, approximately 60 kW of excess heat is being generated, which heats the fuel cells up approximately 4 times faster. Polarization curve 302 will approach the nominal temperature polarization curve 202 faster, enabling the power system to achieve full power capability in a shorter time. More power becomes available as the polarization curve moves outward.

Various embodiments may sequentially source additional BOP devices in a selective manner as the polarization curve continues to move outward during the start-up process. By maintaining the voltage of the fuel cell stack 102 within the start-up voltage range 206, some amount of excess heat continues to be generated within the fuel cell stack 102 to support the start-up process. For convenience, FIGS. 2 and 3 conceptually illustrate hypothetical stages of the start-up process wherein BOP devices are sequentially sourced in a selective manner from the fuel cell stack 102 at the start-up voltage as additional power becomes available. That is, embodiments employ an incremental process of sequentially sourcing a plurality of BOP devices at the reduced start-up voltage as the start-up process proceeds. If the fuel cell will provide more power at the reduced start-up voltage than can be used by the BOP loads, system load, and the charging of the auxiliary power source, then the voltage will rise and the current will drop to maintain power balance.

Summarizing, the start-up process illustrated in FIGS. 2 and 3 demonstrate that maintaining the voltage of the fuel cell stack within the start-up voltage range 206 during the start-up process more rapidly increases the temperature of the fuel cell stack 102. The increasing temperature of the fuel cell stack 102 moves the polarization curve outwards faster so that additional power is available from the fuel cell stack while it is operated at a start-up voltage.

BOP Device Operation Overview

Returning to FIG. 1, in the context of embodiments of the power system 100 that sequentially power BOP devices during a start-up process, a hypothetical start-up process is described. Initially, fuel must be injected into the anode 108 and air into the cathode. As noted above, the controller 104, valve 130, and pump 122 are sourced from the auxiliary power source 188. Accordingly, the initially added fuel and air starts the electrochemical reaction process, and the fuel cell stack 102 begins to warm up.

At some early stage in the start-up process, the increasing voltage of the fuel cell stack 102 reaches the above-described start-up voltage (FIGS. 2 and 3). In one embodiment, the start-up voltage corresponds to a voltage within a range of 100 V to 150 V, described above as the start-up voltage range 206. In an embodiment employing 400 to 500 individual fuel cells in a fuel cell stack 102, each fuel cell is operated at a reduced start-up voltage of approximately 0.2 V to 0.4 V.

In one exemplary embodiment, when sufficient power is available, a first selected BOP device begins to operate with power sourced from the fuel cell stack 102. In this example, motor 164 is the first selected BOP device. As noted above, oxidant supply device 134 provides a reduced rate of airflow to the fuel cells 106 when motor 164 is sourced at the reduced start-up voltage range 206. The reduced rate of airflow is at least sufficient to initiate and maintain the electrochemical reaction process with the fuel during start-up of the power system 100.

As the rate of electrochemical reaction increases, the amount of power that may be drawn from the fuel cell stack 102 increases. At a later stage in the start-up process, one or more additional BOP devices may be sourced from the fuel cell stack 102 at the reduced start-up voltage.

For example, the fuel recirculation system 120 may be started by the controller 104 to begin circulation of the fuel stream. Initially, the fuel recirculation system 120 may not be needed since there is sufficient fuel in the anode 108. However, at some point, it becomes desirable to refresh the anode 108 with a circulating flow of fuel. Accordingly, the fuel recirculation system 120 recirculates the fuel stream to the anode 108. The fuel stream is recirculated at a reduced rate when motor 166 is sourced at a reduced start-up voltage. At this point in the start-up process, the reduced rate of fuel stream recirculation is sufficient provide an adequate amount of fuel to maintain the electrochemical reaction process.

As the start-up process continues, the rate of electrochemical reaction further increases since the excess heat generated by operating the fuel cell stack 102 at the reduced start-up voltage moves the above-described polarization curve outward. That is, the amount of power that may be drawn from the fuel cell stack 102 at the reduced start-up voltage further increases. At some point, yet another BOP device may be selectively sourced from the fuel cell stack 102 at the reduced start-up voltage.

For example, the thermal management system 146 may be started by the controller 104 to begin circulation of thermal transport fluids. Initially, because the fuel cell stack 102 is cold, the thermal management system 146 may not be needed. However, at some point, it may become desirable to operate the thermal management system heater 150 to heat the thermal transport fluid. Thus, controller 104 may turn on the thermal management system heater 150 and operate it at the reduced start-up voltage. (Alternatively, the thermal management system heater 150 might be sourced from the auxiliary power source 154.) Accordingly, the thermal management system 146 circulates the heated thermal transport fluid at a reduced rate to the fuel cell stack 102.

As the start-up process continues, other devices may be sourced from the power system 100 at the reduced start-up voltage. For example, in some automotive applications, an electric passenger compartment heater (not shown) may be used to heat the passenger compartment. During the start-up process, the passenger compartment heater could be operated at the reduced start-up voltage to begin heating the passenger compartment. Some level of heating may be desirable, even if the passenger compartment heater is operating at a reduced output when sourced at the reduced start-up voltage. Hence, the startup voltage can be controlled within the load dump limited of the system by adjust the power flow to each of the various loads in the system.

As noted above, the reduced start-up voltage is within the exemplary reduced start-up voltage range 206 of 100 V to 150 V. In other embodiments (which may use other types of fuel and/or different numbers of fuel cells in a fuel cell stack 102), the reduced start-up voltage and/or reduced start-up voltage range 206 may be different than described above. All such variations in embodiments of the power system 100 are intended to be included within the scope of this disclosure.

During the above-described start-up process, the output voltage of the fuel cell stack 102 is maintained within the start-up voltage range 206 (FIG. 2). In one embodiment, controller 104 controls a DC/DC converter 158 such that the voltage is maintained at the start-up voltage and/or within the start-up voltage range 206. It is appreciated that the internal components of DC/DC converter 158 must be operable over a wide range of DC input voltages, ranging from the start-up voltage to the nominal operating voltage.

Current flow from the fuel cell stack 102 may be controlled by selectively sourcing the above-described BOP devices. Also, variable speed devices, such as motors 164, 166, and/or 168 may be controllably operated to draw a desired amount of current from the fuel cell stack 102.

In addition to facilitating a quicker start-up of the fuel cell stack 102, another advantage realized by the power system 100 is that power drawn from the auxiliary power source 154, such as a battery or ultra-capacitor, may be reduced or even minimized. Under some circumstances, power may be provided from the fuel cell stack 102 for recharging the auxiliary power source 154.

ALTERNATIVE EMBODIMENTS

Figure 4:
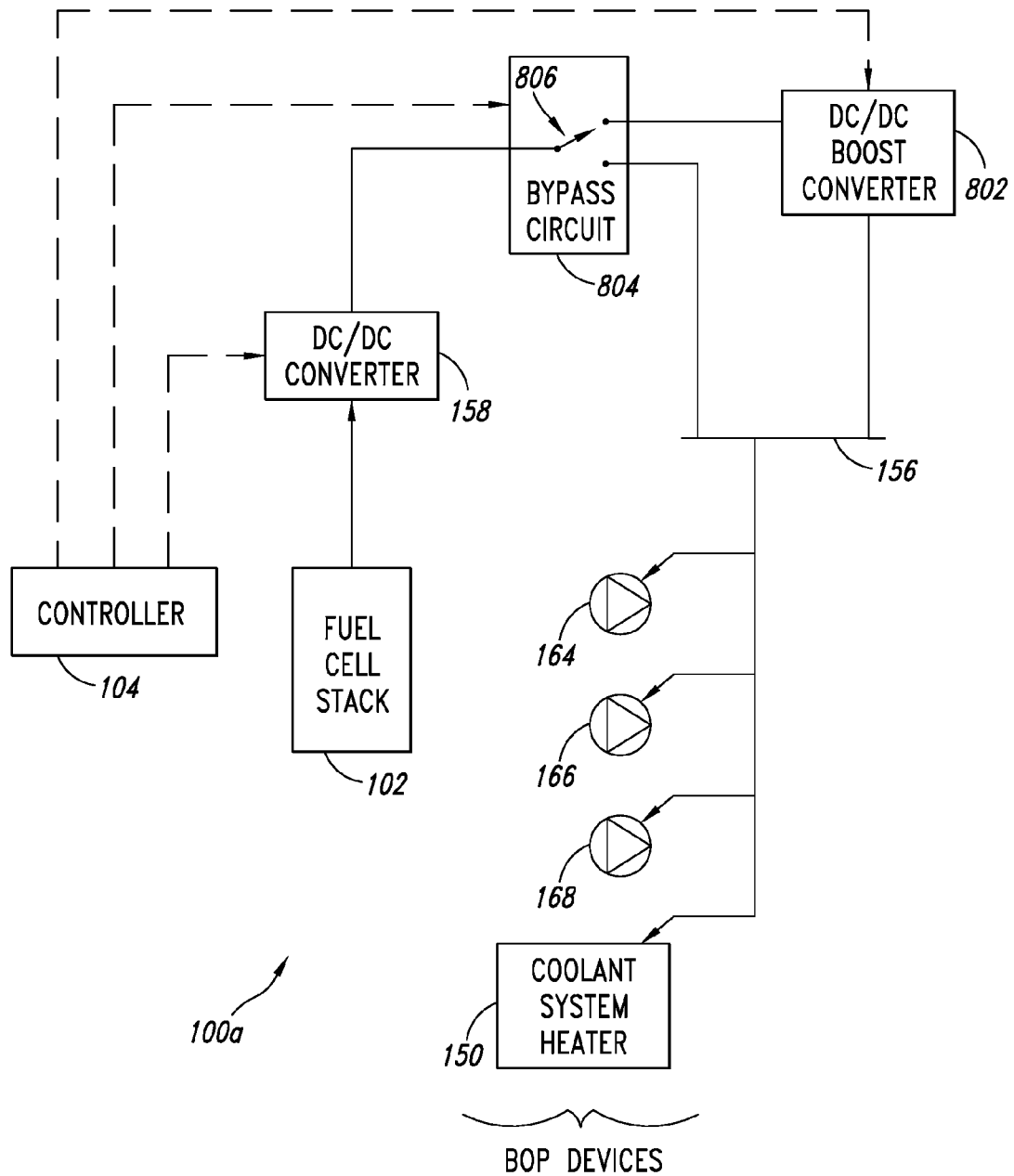
FIG. 4 is a schematic diagram of an alternative embodiment of a fuel cell system employing a start-up boost converter and an optional bypass circuit.

FIG. 4 is an alternative embodiment of a power system 100a employing a DC/DC boost converter 802 and a bypass circuit 804. The boost converter 802 is a DC/DC converter system that steps up (boosts) the reduced start-up voltage received from the fuel cell stack 102 to a nominal DC voltage. Accordingly, during the start-up process, the above-described BOP devices are sourced from the boost converter 802 at their nominal operating voltages. Once the fuel cell stack 102 is operating at its nominal voltage, boosting of the reduced start-up voltage ends and the BOP devices are sourced at the nominal operating voltage directly from the fuel cell stack 102.

Bypass circuit 804 comprises switching circuitry 806. For convenience, switching circuitry 806 is illustrated as a simplified generic switch. When operated in a first state by controller 104, the bypass circuit 804 couples the output of the DC/DC converter 158 to the DC/DC boost converter 802. When operated in a second state by controller 104, the bypass circuit 804 couples the output of the DC/DC converter 158 to the DC bus 156.

Any suitable switching circuitry 806 (e.g., power transistors such as FETs and IGBTs, relays, etc.) may be used for the bypass circuit 804. The types of switching circuitry 806 that may be used in the various embodiments of the power system 100a are too numerous to conveniently describe herein, and accordingly, such descriptions are omitted for brevity. All such types of bypass circuits 804 are intended to be included within the scope of this disclosure.

Figure 5:
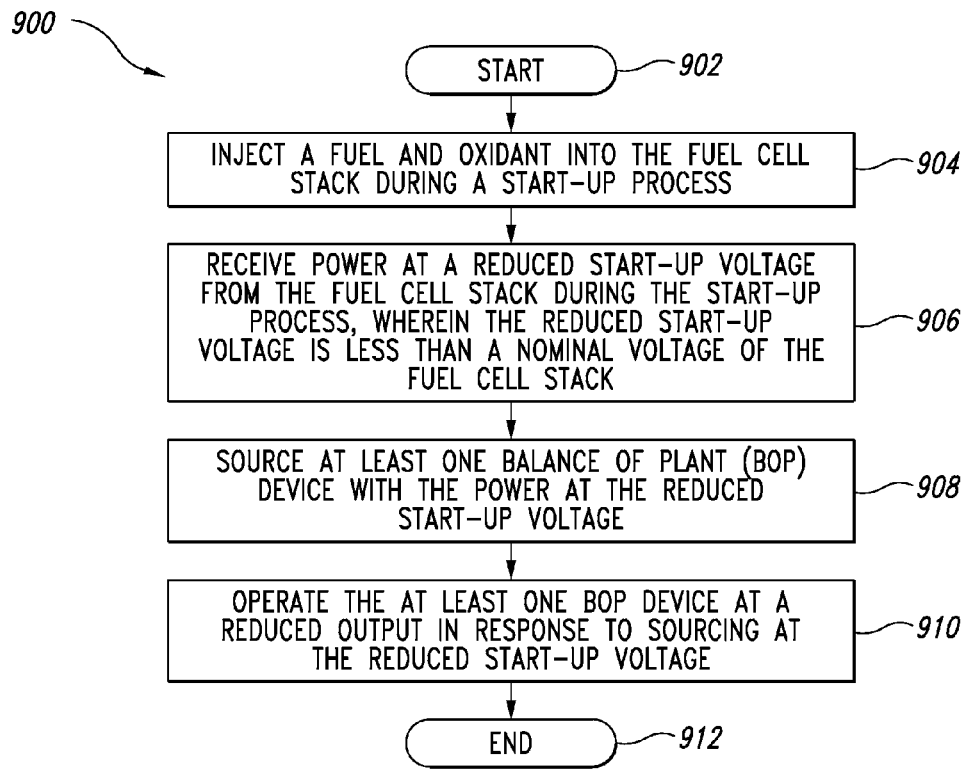
FIGS. 5 and 6 are flowcharts illustrating embodiments of a process for starting up a fuel cell system.
Figure 6:
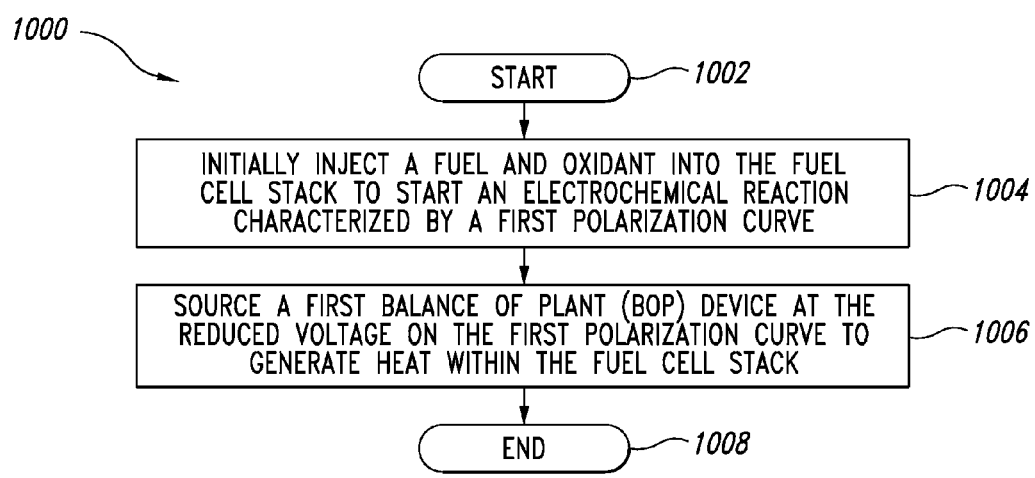

FIGS. 5 and 6 are flowcharts illustrating embodiments of a process for implementing start-up of the electromechanical generation process in a fuel cell stack 102 (FIG. 1). An alternative embodiment implements the logic of the flow charts of FIGS. 5 and 6 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIGS. 5 and 6, or may include additional functions. For example, two blocks shown in succession in FIGS. 5 and 6 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

One exemplary embodiment of a process 900 of starting up a fuel cell stack 102 is illustrated in FIG. 5. The process 900 begins at block 902. A fuel and oxidant is injected into the fuel cell stack 102 during a start-up process at block 904. Power is received at a reduced start-up voltage from the fuel cell stack 102 during the start-up process, wherein the reduced start-up voltage is less than a nominal voltage of the fuel cell stack 102 at block 906. At least one balance of plant (BOP) device is sourced with the power at the reduced start-up voltage at block 908. The at least one BOP device is operated at a reduced output in response to sourcing at the reduced start-up voltage at block 910. The process ends at block 912.

An exemplary embodiment of a process 1000 of starting up a fuel cell stack 102 is illustrated in FIG. 6. The process 1000 begins at block 1002. A fuel and oxidant is initially injected into the fuel cell stack 102 to start an electrochemical reaction characterized by a first polarization curve at block 1004. A first balance of plant (BOP) device is sourced at the reduced voltage on the first polarization curve to generate heat within the fuel cell stack 102 at block 1006. The process ends at block 1008.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein can be applied to other power systems, not necessarily the exemplary embodiments generally described above. For example, the power system 100 may comprise additional primary DC/DC power converters or primary DC/DC power converters with different topologies, as may be suited to the particular application.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) and/or a drive board or circuitry, along with any associated memory, such as random access memory (RAM), read only memory (ROM), electrically erasable read only memory (EEPROM), or other memory device storing instructions to control operation. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the above U.S. patents, patent applications and publications referred to in this specification are incorporated herein by reference, in their entirety. Aspects can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for starting an electrochemical reaction in a fuel cell stack, the method comprising:
   injecting a fuel into the fuel cell stack during a start-up process;
   receiving power at a reduced start-up voltage from the fuel cell stack during the start-up process, wherein the reduced start-up voltage is less than a nominal voltage of the fuel cell stack;
   sourcing at least one balance of plant (BOP) device in the form of an oxidant supply device with the power at the reduced start-up voltage; and
   operating the at least one BOP device at a reduced output in response to sourcing at the reduced start-up voltage to provide a reduced rate of air flow to the cathode of the fuel cell stack.

2. The method of claim 1, further comprising:
   maintaining the reduced start-up voltage during the start-up process to generate heat within the fuel cell stack, wherein the generated heat increases a temperature of the fuel cell stack.

3. The method of claim 1, further comprising:
   sourcing a fuel recirculation pump motor at the reduced start-up voltage to recirculate the fuel through the fuel cell stack at a reduced rate of flow.

4. The method of claim 1, further comprising:
   sourcing a thermal management system heater to heat a fluid during the start-up process; and
   sourcing a thermal management system motor at the reduced start-up voltage to circulate the fluid when heated through the fuel cell stack at a reduced rate of flow to increase a temperature of the fuel cell stack.

5. The method of claim 1 wherein sourcing the at least one BOP device comprises:
   sourcing a variable speed motor at the reduced start-up voltage so that the variable speed motor operates at a reduced speed.

6. The method of claim 1 wherein sourcing the at least one BOP device comprises:
   sourcing a variable speed motor at the reduced start-up voltage so that the variable speed motor operates at a reduced torque.

7. The method of claim 1, further comprising:
   maintaining a voltage of the fuel cell stack at the reduced start-up voltage during the start-up process; and
   increasing the voltage of the fuel cell stack to the nominal voltage after an end of the start-up process.

8. The method of claim 1, further comprising:
   boosting the reduced start-up voltage to at least the nominal voltage with a voltage boost converter; and
   sourcing the BOP device from the voltage boost converter with the nominal voltage.

* * * * *